(12) United States Patent
Chang et al.

(10) Patent No.: US 8,719,715 B2
(45) Date of Patent: May 6, 2014

(54) SYSTEM AND METHOD OF IDENTIFYING AND MEASURING RESPONSE TO USER INTERFACE DESIGN

(75) Inventors: Chi-Chao Chang, Santa Clara, CA (US); Yun-Fang Juan, San Jose, CA (US); Amr A. Awadallah, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 187 days.

(21) Appl. No.: 12/831,755

(22) Filed: Jul. 7, 2010

(65) Prior Publication Data

US 2010/0275138 A1 Oct. 28, 2010

Related U.S. Application Data

(63) Continuation of application No. 11/496,825, filed on Jul. 31, 2006, now Pat. No. 7,827,004.

(51) Int. Cl.
*G06F 3/14* (2006.01)

(52) U.S. Cl.
USPC ........... 715/762; 715/700; 717/101; 717/109; 700/103; 370/419; 435/5; 702/108

(58) Field of Classification Search
USPC .................. 715/200–277, 700–867; 700/103, 700/701–866; 709/201–229; 705/50–79; 345/30–111; 717/101, 109; 435/5; 702/108

See application file for complete search history.

(56) References Cited

U.S. PATENT DOCUMENTS

| | | | | |
|---|---|---|---|---|
| 7,626,994 | B2 * | 12/2009 | Bennett | 370/419 |
| 8,417,476 | B2 * | 4/2013 | Hunt | 702/108 |
| 2007/0259337 | A1 * | 11/2007 | Hully et al. | 435/5 |
| 2008/0016490 | A1 * | 1/2008 | Pabalate et al. | 717/101 |
| 2008/0127065 | A1 * | 5/2008 | Bryant et al. | 717/109 |
| 2009/0216359 | A1 * | 8/2009 | McConaghy et al. | 700/103 |

* cited by examiner

*Primary Examiner* — Ruay Ho
(74) *Attorney, Agent, or Firm* — James J. DeCarlo; Greenberg Traurig, LLP (57) ABSTRACT

In accordance with aspects disclosed herein, impact that a user interface design has on a user's experience is measured. User response to one or more user interface designs is measured. Two or more user interface designs can be compared based on user response to each design. A single user interface design can be evaluated based on one or more measures of user response to the user interface, or two or more user interface designs can be compared using one or more user response measures corresponding to the user interface designs.

12 Claims, 9 Drawing Sheets

$$H_0 : \mu_T = \mu_C \quad \text{vs.} \quad H_a : \mu_T \neq \mu_C$$

— 600

$$(X_{Mean_T} - X_{Mean_C}) \pm t_{0.025} * \left( \frac{X_{stdError_{Pooled}}}{\sqrt{\frac{1}{K} + \frac{1}{K}}} \right),$$

where $$X_{stdError_{Pooled}} = \sqrt{[df_T * X_{stdDev_T}^2 + df_C * X_{stdDev_C}^2]/df_{T+C}},$$

$$df_{T+C} = df_T + df_C, \text{ and}$$

| Partition No. | Page Views | Clicks | Observed CTR | Partition No. | Page Views | Clicks | Observed CTR |
|---|---|---|---|---|---|---|---|
| 0 | 41625 | 39118 | 93.98% | 16 | 40289 | 38169 | 94.74% |
| 1 | 40476 | 38730 | 95.69% | 17 | 42074 | 38574 | 91.68% |
| 2 | 42126 | 40478 | 96.09% | 18 | 41171 | 38065 | 92.46% |
| 3 | 42203 | 37953 | 89.93% | 19 | 41606 | 38942 | 93.60% |
| 4 | 41700 | 38635 | 92.65% | 20 | 40672 | 38588 | 94.88% |
| 5 | 40529 | 39519 | 97.51% | 21 | 43347 | 38390 | 88.56% |
| 6 | 40316 | 36376 | 90.23% | 22 | 41971 | 39206 | 93.41% |
| 7 | 40912 | 38523 | 94.16% | 23 | 42308 | 39339 | 92.98% |
| 8 | 41807 | 37953 | 90.78% | 24 | 41485 | 38327 | 92.39% |
| 9 | 40352 | 37406 | 92.70% | 25 | 40829 | 37209 | 91.13% |
| 10 | 41328 | 38641 | 93.50% | 26 | 41756 | 38363 | 91.87% |
| 11 | 42204 | 38739 | 91.79% | 27 | 42159 | 38159 | 90.51% |
| 12 | 41402 | 37681 | 91.01% | 28 | 42358 | 37607 | 88.78% |
| 13 | 42219 | 36944 | 87.51% | 29 | 40756 | 36426 | 89.38% |
| 14 | 41554 | 37717 | 90.77% | 30 | 41679 | 38002 | 91.18% |
| 15 | 40926 | 39068 | 95.46% | 31 | 40707 | 39488 | 97.01% |

Figure 3

Group A's CTR equals 84%, and Group B's CTR equals 85%

Scenario One:
  Group A's CTR range is 84% +/- 4% (or 81% to 88%), and
  Group B's CTR range is 85% +/- 4% (or 81% to 89%).

Scenario Two:
  Group A's CTR range 84% +/- 0.5% (or 83.4% to 84.5%),
  Group B's CTR and range is 85% +/- 0.5% (or 84.5% to 85.5%).

Figure 4

$$\underbrace{X_{mean}}_{501} \pm \underbrace{t_{0.025}}_{502} * \underbrace{X_{stdError}}_{503},\quad 500$$

where $$X_{stdError} = X_{stdDev}/\left(\sqrt{K}\right) \quad 505$$

| K | Degrees Of Freedom | T-Critical Value |
|---|---|---|
| 8 | 7 | 2.365 |
| 16 | 15 | 2.131 |
| 32 | 31 | 2.04 |
| infinity | infinity | 1.96 |

$$X_{Mean} = \frac{\sum_{i=1}^{K} X_{Mean_i}}{K}$$

— 507

$$X_{stdDev} = \sqrt{\frac{\sum_{i=1}^{K} (X_{Mean_i} - X_{Mean})^2}{K-1}}$$

$$X_{Mean} \pm 2.04 * X_{stdDev} / (\sqrt{32})$$

Figure 5D $$H_0 : \mu_T = \mu_C \quad \text{vs.} \quad H_a : \mu_T \neq \mu_C$$

$$(X_{Mean_T} - X_{Mean_C}) \pm t_{0.025} * \left( \frac{X_{stdError_{Pooled}}}{\sqrt{\frac{1}{K} + \frac{1}{K}}} \right),$$

where $$X_{stdError_{Pooled}} = \sqrt{[df_T * X^2_{stdDev_T} + df_C * X^2_{stdDev_C}]/df_{T+C}},$$
$$df_{T+C} = df_T + df_C, \text{ and}$$
$$df_T = df_C = K - 1$$

Figure 6A

Figure 6B $$t = \frac{X_{mean_T} - X_{mean_C}}{\sqrt{\left[\frac{df_T * X^2_{stdDev_T} + df_C * X^2_{stdDev_C}}{df_{T+C}}\right]\left[\frac{1}{K} + \frac{1}{K}\right]}},$$

where $df_{T+C} = df_T + df_C$, and $df_T = df_C = K - 1$

SYSTEM AND METHOD OF IDENTIFYING AND MEASURING RESPONSE TO USER INTERFACE DESIGN

CROSS REFERENCE TO RELATED APPLICATIONS

This application is a continuation of, and claims priority from, U.S. patent application Ser. No. 11/496,825, filed Jul. 31, 2006, now U.S. Pat. No. 7,827,004 entitled "System And Method Of Identifying And Measuring Response To User Interface Design", the contents of which are incorporated herein by reference.

BACKGROUND

1. Field

This disclosure relates to user interface design, and more particularly to a system and method of evaluating response to a user interface design, such as a new or updated user interface design.

2. General Background

A user interface is typically a user's primary mechanism for interfacing with the software application. Software developers/engineers can therefore expend considerable time and effort in designing a user interface. A design can typically involve a design layout with a number of choices and features to be made available to the user via the user interface, as well as layout and content of information to be presented to the user in a user interface, for example. User interface design is not limited to an initial design, but can also include changes to an existing user interface. A user interface design, or modifications to a user interface design, can impact a user's experience, positively or negatively. However, it is difficult to determine the impact of a user interface design on a user's experience.

SUMMARY

The present disclosure seeks to address these failings and to provide a system and method of evaluating response to a user interface design, such as a new or updated user interface design.

In accordance with aspects disclosed herein, impact that a user interface design has on a user's experience is measured. Embodiments of the present disclosure provide the ability to measure user response to one or more user interface designs. Embodiments of the present disclosure provide an ability to compare two or more user interface designs based on user response to each design. Embodiments of the present disclosure provide an ability to evaluate a single user interface design based on one or more measures of user response to the user interface, or to compare two or more user interface designs using one or more user response measures corresponding to the user interface designs. For example, one user interface design can incorporate a change to another user interface design. In addition, one or more embodiments can be used to compare two or more separate, and/or diverse, user interface designs from different sources, e.g., different software applications or vendors.

Embodiments of the disclosure evaluate a user interface design, referred to as a test user interface design, based on at least one metric, or measure, of a user's response and a corresponding metric associated with at least one other user interface design, referred to as a control design. Data is collected in connection with the test and control user interface designs. The data collected can include the user response metric, or the data can be used to generate a user response metric. One or more user response metrics can be used to evaluate user response to the test user interface design relative to the at least one control user interface design.

In accordance with one or more embodiments of the present disclosure, the data collected for the test user interface design and the at least one control user interface design is partitioned into multiple partitions, a set of partitions corresponding to the test user interface design and a set of partitions corresponding to the at least one control user interface design. A metric corresponding to sample data contained in a given partition associated with the test user interface design is aggregated to yield an aggregate metric value for the test user interface design, and a metric corresponding to sample data contained in a given partition associated with the control user interface design is aggregated to yield an aggregate metric value control user interface design. The aggregate metric value associated with the test user interface design is examined relative to the aggregate metric value associated with the control user interface design so as to determine whether or not a difference exists in user response.

Embodiments of the disclosure evaluate a test user interface design based on observed user response to the test user interface design relative to observed user response to a control user interface design. Data corresponding to observed user response of a first set of users to the test user interface design, and data corresponding to observed user response of a second set of users to the control user interface design are collected. A user response metric is determined for each user interface design based on the observed user response data collected for each user interface design. A determination is made whether or not the user response metric corresponding to the test user interface design differs from the user response metric corresponding to the control user interface design. In accordance with one or more embodiments of the present disclosure the user response metric is a mean, and the determination of whether or not the user response metrics differ comprises determining a confidence interval on a difference between the means, such that user response to the test user interface design and user response to the control user interface design are determined to differ if the confidence interval excludes zero.

DRAWINGS

The above-mentioned features and objects of the present disclosure will become more apparent with reference to the following description taken in conjunction with the accompanying drawings wherein like reference numerals denote like elements and in which:

FIG. 1, which comprises FIGS. 1A and 1B, provide a user response evaluation process flow for use in accordance with at least one embodiment of the present disclosure.

FIG. 5, which comprises FIGS. 5A to 5D, provides an example of an expression that can be used to calculate a value range for a metric in accordance with one or more embodiments of the invention.

FIG. 6, which comprises

DETAILED DESCRIPTION

In general, the present disclosure includes a system and method of evaluating response to a user interface design, such as a new or updated user interface design.

Certain embodiments of the present disclosure will now be discussed with reference to the aforementioned figures, wherein like reference numerals refer to like components.

Embodiments of the disclosure evaluate a user interface design, referred to as a test user interface design, based on at least one metric, or measure, of a user's response and a corresponding metric associated with at least one other user interface design, referred to as a control design. Data is collected in connection with the test and control user interface designs. The data collected can include the user response metric, or the data can be used to generate a user response metric. One or more user response metrics can be used to evaluate user response to the test user interface design relative to the at least one control user interface design.

In accordance with one or more embodiments of the present disclosure, the data collected for the test user interface design and the at least one control user interface design is partitioned into multiple partitions, a set of partitions corresponding to the test user interface design and a set of partitions corresponding to the at least one control user interface design. A metric corresponding to sample data contained in a given partition associated with the test user interface design is aggregated to yield an aggregate metric value for the test user interface design, and a metric corresponding to sample data contained in a given partition associated with the control user interface design is aggregated to yield an aggregate metric value control user interface design. The aggregate metric value associated with the test user interface design is examined relative to the aggregate metric value associated with the control user interface design so as to determine whether or not a difference exists in user response.

Embodiments of the disclosure evaluate a test user interface design based on observed user response to the test user interface design relative to observed user response to a control user interface design. Data corresponding to observed user response of a first set of users to the test user interface design, and data corresponding to observed user response of a second set of users to the control user interface design are collected. A user response metric is determined for each user interface design based on the observed user response data collected for each user interface design. A determination is made whether or not the user response metric corresponding to the test user interface design differs from the user response metric corresponding to the control user interface design. In accordance with one or more embodiments of the present disclosure the user response metric is a mean, and the determination of whether or not the user response metrics differ comprises determining a confidence interval on a difference between the means, such that user response to the test user interface design and user response to the control user interface design are determined to differ if the confidence interval excludes zero.

Embodiments of the present disclosure use at least one metric to measure a user's response to a user interface design. A user interface can comprise a single display or screen, or multiple displays/screens. Using a user interface of a web site, or portal, provider as one example of a user interface which can comprise one or more web pages, examples of such measures of user response can be, without limitation, number of page views (e.g., number of times a page is viewed by a user), number of clicks/selections made by a user, click through rate (e.g., a ratio of a number of clicks/selections to a number of page views), an amount of time spent on a web page, revenue generated (e.g., from selection of an advertisement within a web page, etc.), a number of return visits in a given period of time, etc.

Figure 1A:
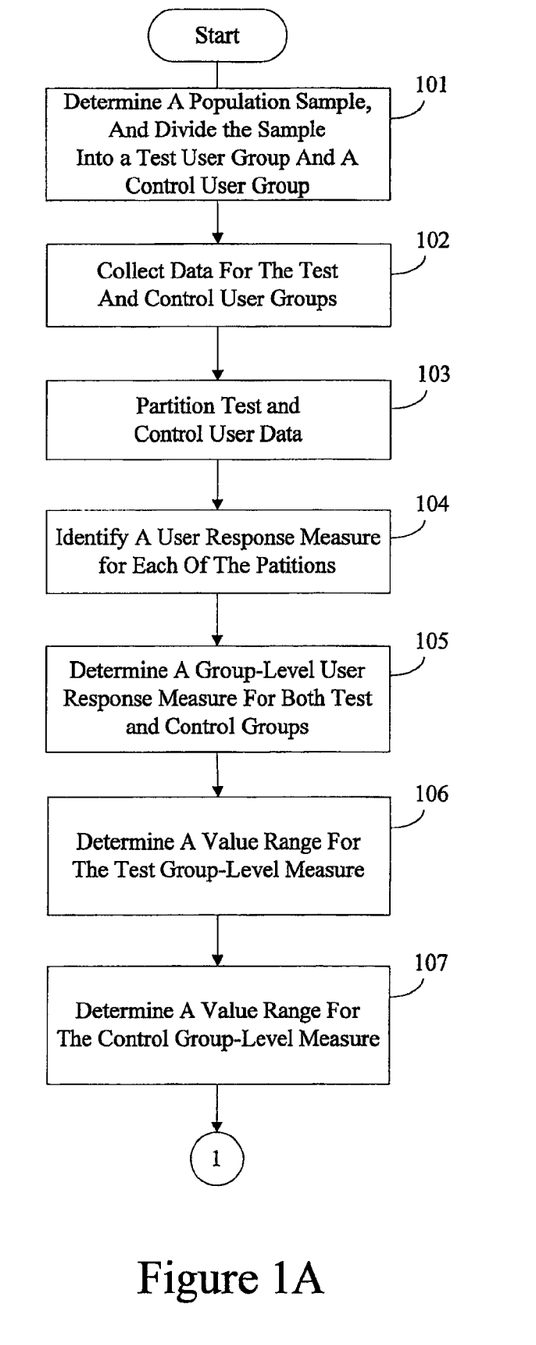
Figure 1B:
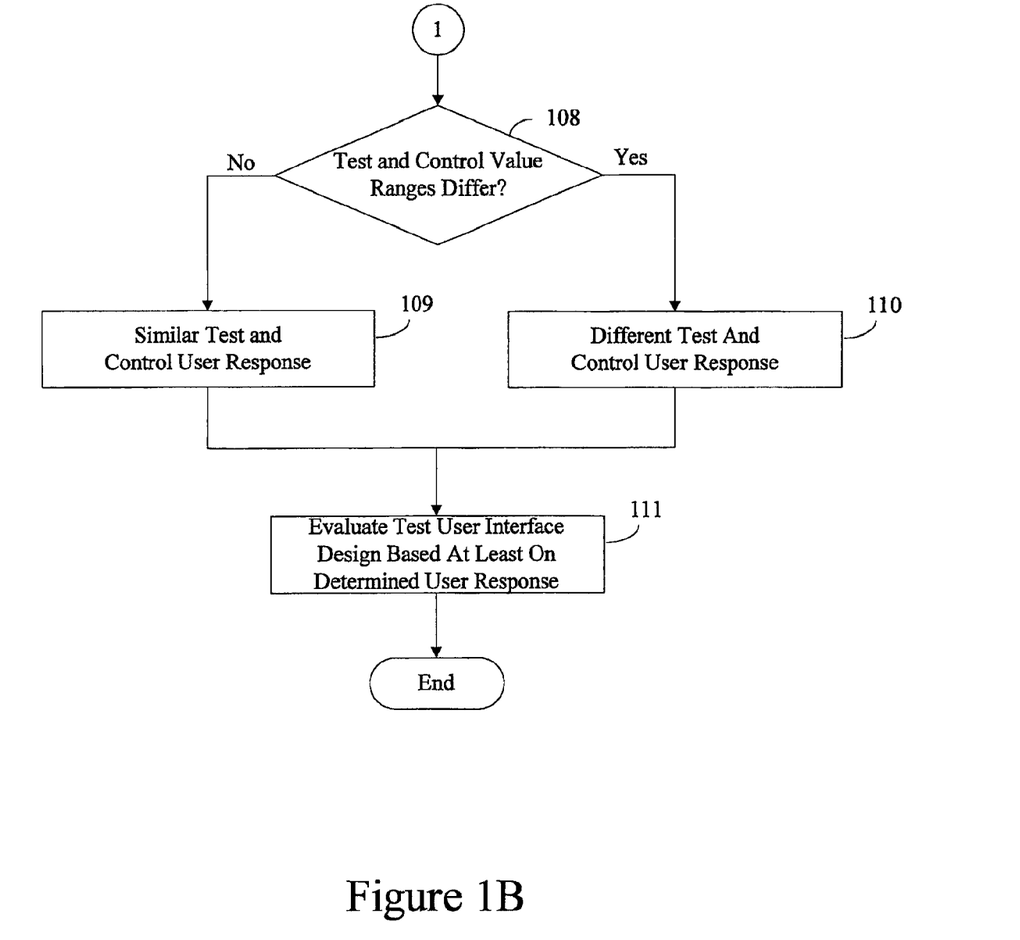

FIG. 1, which comprises FIGS. 1A and 1B, provide a user response evaluation process flow for use in accordance with at least one embodiment of the present disclosure.

Generally, sample user populations are identified for the test and control user interface designs. In accordance with one or more embodiments, one or more user interfaces, each of which corresponds to a user interface design, are displayed, or otherwise provided, to users. Data is collected for the test and control user groups. The data collected is partitioned such that the data collected for the test user group data is partitioned into N partitions, and the data collected for the control user group is partitioned into N partitions. A metric value is identified for each of the N partitions, such that there are N metric values associated with each of the test and control user groups, each of the N metric values correspond to a user response measure. A group-level metric, e.g., mean, is determined from the N metric values for each of the test and control user groups.

A range is determined for each of the test and control group-level metric values, and a determination is made whether or not the test group-level range of values differ from the control group-level value range. If a difference is determined to exist, the user population is considered to have a different response to the test user interface design than the control user interface design. Conversely, if a difference is determined not to exist, the user population is consider to have a similar response to the test and control user interface designs. The presence or absence of a determined user response difference between the test and control can be used to evaluate a test user interface design relative to a control user interface design.

Referring to FIG. 1, at step 101, a sample (e.g., random sample) of a user population is identified, which user population sample is divided into a test user group and a control user group. In accordance with one or more embodiments, a sample size can be determined based on a threshold probability, p, and margin for error, r. The following provides an example of a formula which can be used to determine a sample size, n, given values of p and r.

$$n > \frac{4*(1-p)}{p*r^2}$$

To illustrate in a case in which p is equal to 2% and r is equal to 1%, the sample size, n, is greater than 1,960,000.

At step 102, data is collected for both the test and control user groups. Data collection can be based on observations of user behavior, and/or based on feedback solicited from the user such as in the form of answers to a survey regarding the user interface, for example. At step 103, the data collected for the test and control user groups is partitioned, e.g., into an equal number of partitions for the test and control groups. More particularly, the data collected for the test user group data is partitioned into N partitions, and the data collected for the control user group is partitioned into N partitions. In accordance with at least one embodiment, all data generated from a particular user will fall in one partition. In accordance with at least one embodiment, each partition is at least approximately the same size, e.g., number of entries in each partition is the same or approximately the same.

Figure 3:
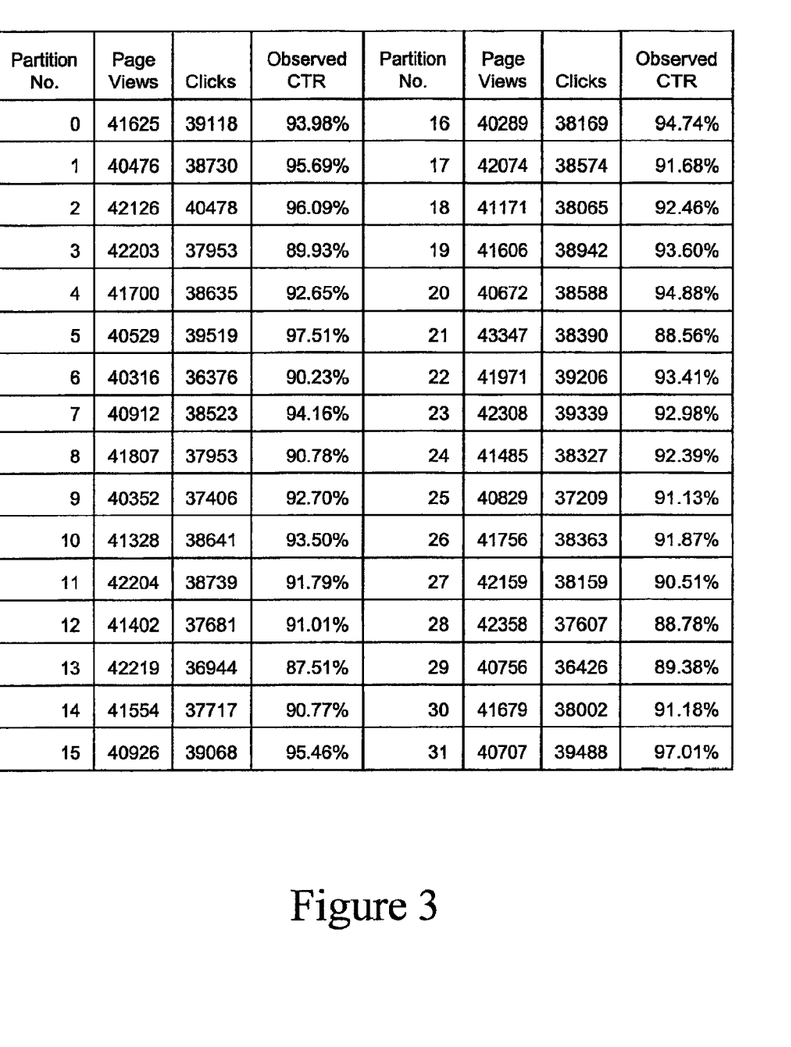
FIG. 3 provides an example of a partition-level measures for use in accordance with one or more embodiments of the present disclosure.

A metric value is identified for each of the N partitions, at step 104, such that there are N metric values associated with each of the test and control user groups, each of the N metric values corresponding to a user response measure. FIG. 3 provides an example of a set of partitions and corresponding partition-level data measures for use in accordance with one or more embodiments of the present disclosure. In the example, there are thirty-two partitions, each having a page view total, which identifies a number of views of a page observed for a given user interface (e.g., a test or control user interface web page), and a number of clicks, which identifies a number of selections observed in a page of a user interface. A click through rate, CTR, is also shown for each partition, which can be derived from the page views and click values, and corresponds to a percentage determined to be the ratio of clicks to page views.

Referring again to FIG. 1, at step 105, a group-level metric, e.g., mean, is determined from the N metric values for each of the test and control user groups. Referring to FIG. 3, for example, a group-level mean can be determined from the CTR values, e.g., a sum of the CTR partition-level values divided by the number of partitions. The test and control group-level metric can be used to estimate of a user population's response to the test and control user interface designs, respectively.

At step 106, a range is determined for the test group-level metric value. At step 107, a range is determined for the control group-level metric value. At step 108, a determination is made whether or not the range corresponding to the test user group differs from the range corresponding to the control group. For example, the test user group's group-level metric range of values can be said to be less than or greater than the control user group's group-level metric value range, a difference can be said to exist. If a difference is determined to exist, the user population can be said to have a different response to the test user interface design than the control user interface design, and such indication is made at step 110. Conversely, if a difference is determined to be absent based on the determined ranges, the user population can be said to have a similar response to the test and control user interface designs, and such indication is made at step 109. The presence or absence of a determined user response difference between the test and control can be used to evaluate a test user interface design relative control user interface design, at step 111. An evaluation can be made based on a given user response metric, and whether it is desirous for the user response metric associated with the test user interface design to be the same, greater than or less than the user response metric associated with a control user interface design.

Figure 4:
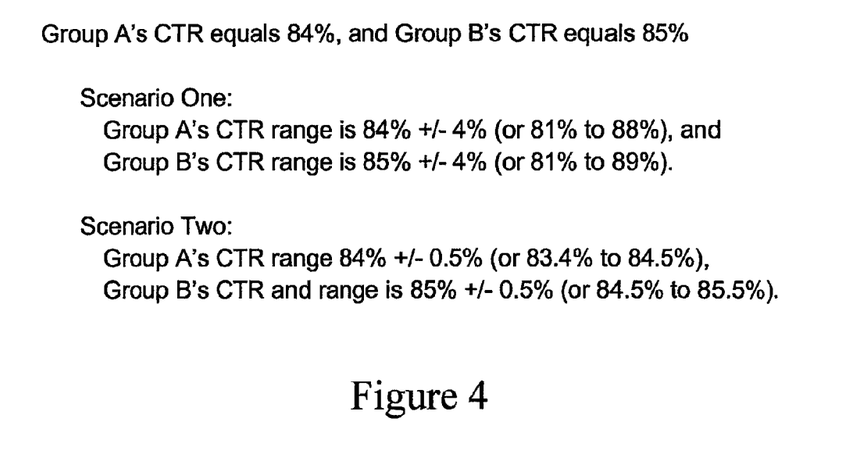
FIG. 4 provides an example of group level metric values associated with two groups, and a corresponding range for each in accordance with embodiments of the present disclosure.

FIG. 4 provides an example of group level metric values associated with groups A and B, and a corresponding range for each in accordance with embodiments of the present disclosure. In the example, a CTR is identified for two user groups, group A and group B. In a first scenario, group A's CTR is 84% and group B's CTR is 85%. From these values, it appears that group B's CTR is greater than group A's CTR. However, when each group's CTR value range is taken into account, group A's CTR value can range from 81% to 88%, and group B's CTR value can range from 81% to 89%. Thus, without taking each group's range of values into account, an inquiry based only on the CTR of groups A and B might be deceiving. In the second scenario, which uses the same initial CTR, there is a range of plus/minus 0.5%. Group A's CTR has a range of 83.5% to 84.5%, and group B's CTR has a range of 84.5% to 88.5%. In the second scenario and in contrast to the first scenario, group B's CTR can be said to be greater than group A's CTR. Assuming that it is desirous for a CTR, or click through rate, to be maximized, group B's CTR is more desirous than group A's CTR. Thus and although the difference is not great, it might be concluded that a user interface design associated with group B is more desirous than one associated with group A.

In accordance with one or more embodiments, the group-level metric values are determined using a sampling of less than an entire user population (i.e., a subset of the user population). The group-level metric values can be considered to be estimates of an unknown metric value corresponding to a entire population. A confidence interval can be used to represent an estimated range of values which is likely to include the unknown population metric value. The likelihood that the unknown population metric value is included in the estimated range of values can be expressed as a level of confidence. For example and with reference to group A and the first scenario shown in FIG. 4, in a case that a 95% confidence interval was used to determine the range, it might be said that the CTR for a user population, from which group A is sampled, lies somewhere in the range of 81% to 88%, with a 95% level of confidence.

In accordance with one or more embodiments, a range of values is determined based on a desired level of confidence, a determined "degree of freedom" value, a "t-critical" value, and a determined standard error. These terms are described herein and with reference to FIG. 2, which provides an example of a value range process flow for use in accordance with one or more embodiments of the present disclosure.

Figure 2:
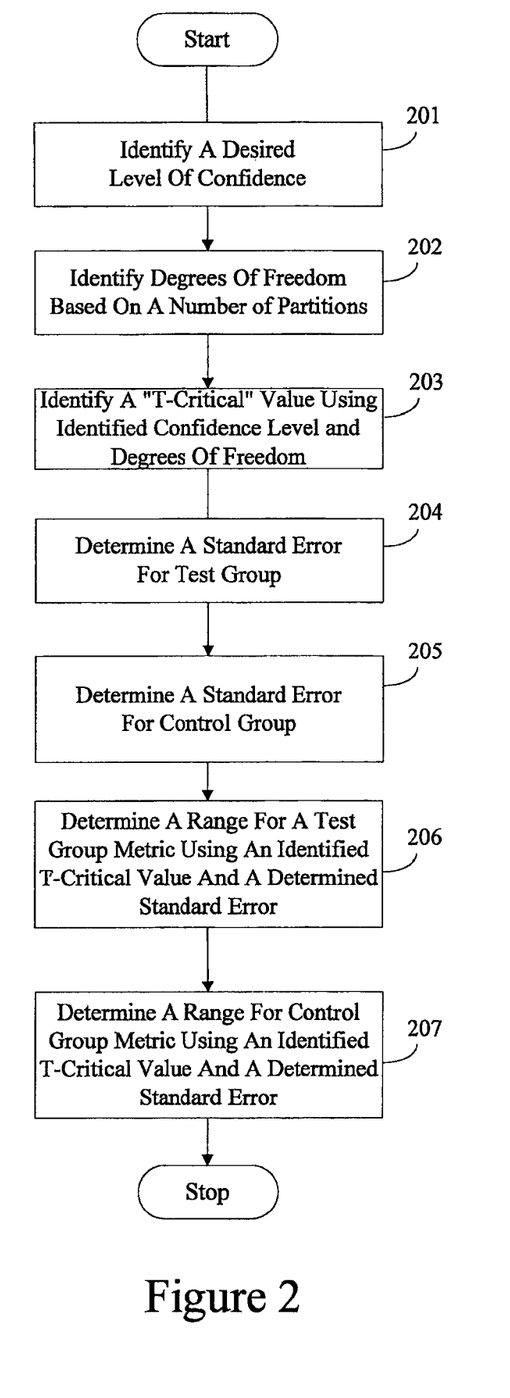
FIG. 2 provides an example of a value range process flow for use in accordance with one or more embodiments of the present disclosure.

Referring to FIG. 2 and at step 201, a desired level of confidence is determined (e.g., 99%, 95%, 90%, etc.). At step 202, a degree of freedom value is determined. In accordance with one or more embodiments, the value is determined based on a number of partitions selected in step 103 of FIG. 1A. To illustrate by way of a non-limiting example, a number of partitions for a given group, e.g., a test group, can be specified to be thirty-two. In such a case, the degrees of freedom for a given group, e.g., the test group, is thirty-two. A degrees of freedom value can be determined to be a combination of the individual degrees of freedom of multiple groups, e.g., the test and user groups. In such a case, the degrees of freedom value can be an aggregate of each group's individual degrees of freedom value. To illustrate by way of a non-limiting example, if the test and control group's individual degrees of freedom value is thirty-one, the combined degrees of freedom value can be sixty-two.

Referring again to FIG. 2 and at step 203, a t-critical value is identified using the confidence level and degrees of freedom values identified in steps 201 and 202, respectively. The t-critical value is a statistically-derived number, and is described in more detail below. At steps 204 and 205, a standard error is determined for the test user group and the control user group, respectively. At step 206, a range is determined for a test user group metric using the identified t-critical value and the test user group's determined standard error. Similarly and at step 207, a range is determined for a control user group metric using the identified t-critical value and the control user group's determined standard error.

Figure 5A:
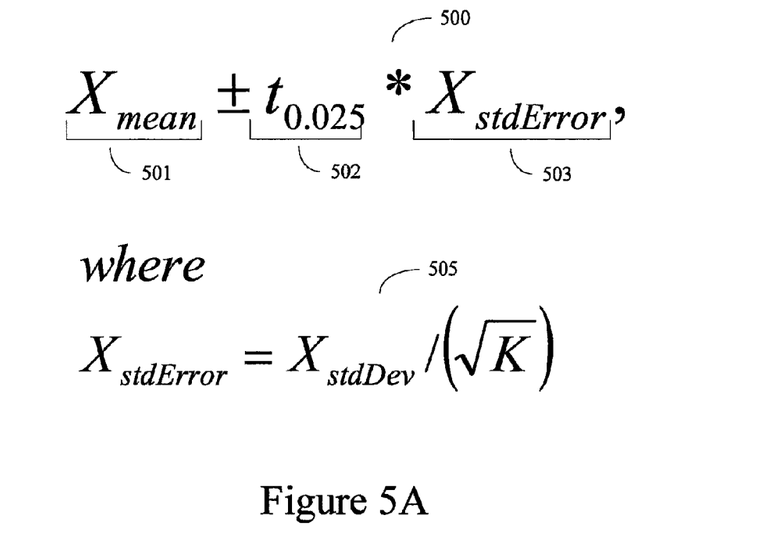
Figure 5B:
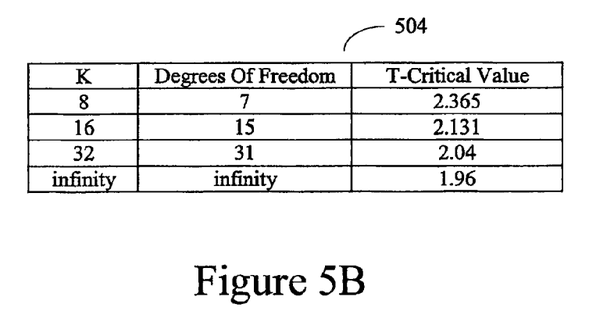
Figure 5C:
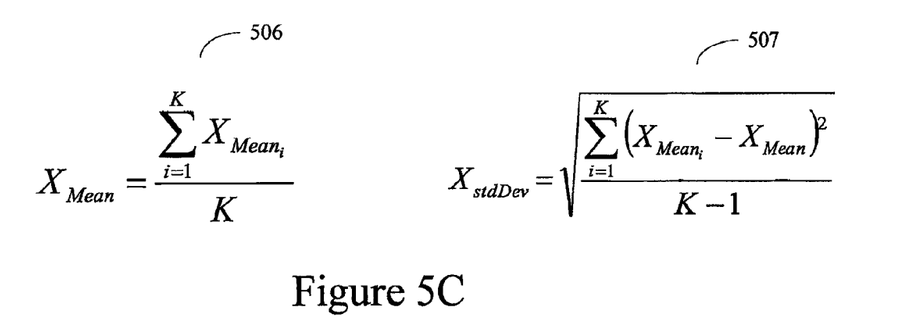

FIG. 5, which comprises FIGS. 5A to 5D, provides an example of an expression that can be used to calculate a value range for a metric in accordance with one or more embodiments of the invention. In the example shown in FIG. 5A, in expression 500, the range is expressed as a metric 501, which is adjusted to determine a lower and upper value of the range of the metric using an adjustment determined by multiplying a t-critical value 502 and a standard error 503. In the example of FIG. 5, the metric 501 is an average, or mean, value, $X_{Mean}$. Expression 506 of FIG. 5C provides an example of an expression that can be used to determine $X_{Mean}$, in accordance with at least one embodiment. In the example, $X_{Mean}$, is the mean of a set of metrics, e.g., an average determined for each of K partitions.

Figure 5D:
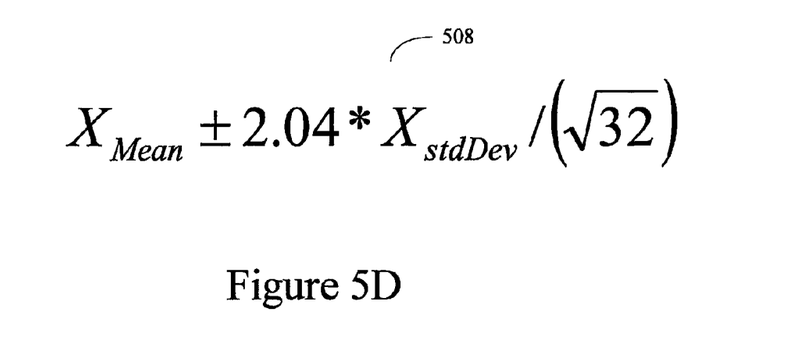

Referring again to FIG. 5A, the t-critical value 502 is represented as $t_{0.025}$. It should be apparent that any t-critical value can be used in accordance with disclosed embodiments. The 0.025 designation indicates that a 95% confidence interval is selected. Referring to FIG. 5B, table 504 contains t-critical values corresponding to a 95% confidential interval. Table 504 illustrates four possible t-critical values corresponding to four degrees of freedom. For example and assuming a degree of freedom of 31, the t-critical value is 2.04. Referring again to FIG. 5A, the t-critical value 502 (e.g., 2.04) is multiplied by a standard error 503, which can be determined using expression 505 of FIG. 5C. Expression 505 includes a standard deviation, which can be determined using expression 507 of FIG. 5C. Expression 508 of FIG. 5D provides an example of expression 500 in a case that K is equal to 32, and the t-critical value is 2.04, which t-critical value can be retrieved from table 504 of FIG. 5B.

Figure 6A:
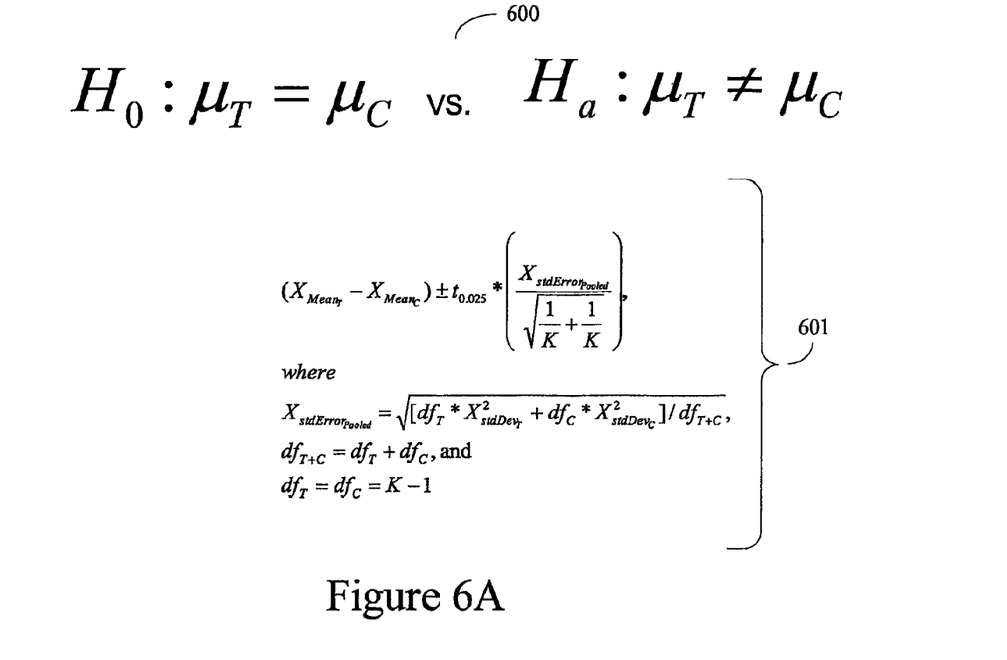
FIGS. 6A and 6C, illustrates an evaluation using null and alternative hypotheses in accordance with one or more embodiments of the present disclosure.

In accordance with one or more embodiments, in the example shown in FIG. 5, the value range for a user response metric can be determined based on a mean and a standard error based on a standard deviation of the user response metric. In one or more embodiments of the present disclosure, a "pooled" value range can be determined for multiple user response metrics, e.g., a user response metric corresponding to both a test and a control user interface design. The pooled value range can be determined based on multiple means, such as in a case that there is a mean determined for a user response metric associated with both a test user interface design and a control user interface design, for example. Expression 601 of FIG. 6A provides an illustration of expressions that can be used to determine a pooled value range. The mean values, $X_{mean_T}$ and $X_{mean_C}$, can be determined using expression 506 of FIG. 5C. The standard deviations, $X_{stdDev_T}$ and $X_{stdDev_C}$, can be determined using expression 507 of FIG. 5C. A pooled standard error, $X_{stdError_{Pooled}}$, can be a combination of a weighted variation of the test and control user response metric, as shown in expression 601 of FIG. 6A.

Expression 601 of FIG. 6A can be used to evaluate a hypothesis, or assumption, that user response to test and control user interface designs is similar, or is somehow different. The range can be used to determine whether or not there is a difference in user response to the test and control user interface designs. That is, if the range includes zero, it can be said that the difference between the user response can be zero.

Stated another way and in accordance with one or more embodiments, user response metrics associated with test and control user interface designs can be evaluated by an examination of null and alternate hypotheses. Referring to FIG. 6A, expression 600 includes a null hypothesis, $H_0$, which assumes that a mean, $\mu_T$, of a test population, T, is equal to a mean, $\mu_C$, of a control population, C. The null hypothesis can be evaluated against an alternate hypothesis, $H_A$, which assumes that the means for populations T and C are not equal. If the null hypothesis is true, a difference of the means will be zero. A t-statistic can be computed to test the null and alternate hypotheses. In accordance with at least one embodiment, a difference of two sample means is used to compute a t-statistic.

Figure 6B:
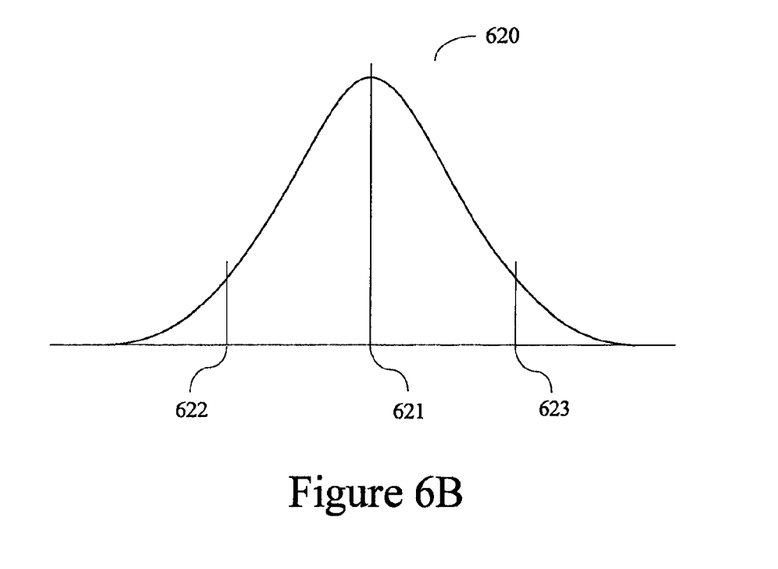
Figure 6C:
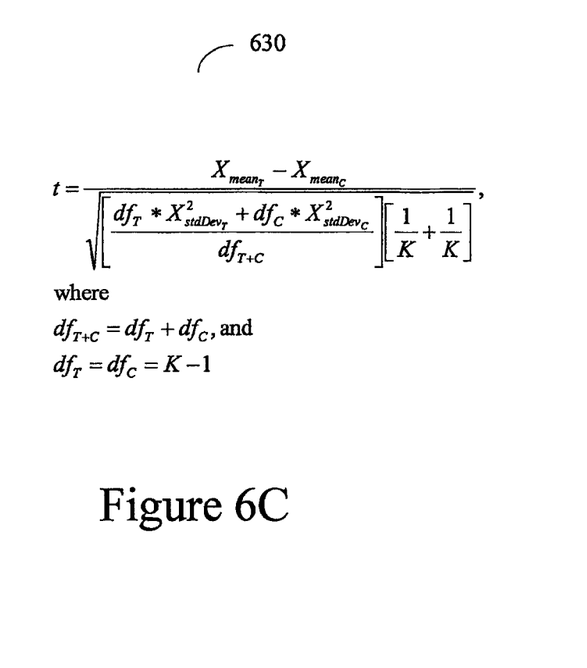

Expression 630 of FIG. 6C can be used to compute a t-statistic, or t. More particularly, a t-statistic, or t, can be determined using the $X_{mean}$ and $X_{stdDev}$ values, the degrees of freedom, and the number of partitions, K, associated with the test and control user groups. The determined t-statistic can be used together with the degrees of freedom to check a t-table for the p-value, which represents the associated probability of user response at the observed or more extreme levels assuming the null hypothesis is true. If the probability of the obtained t-statistic is large, further analysis and/or data collection might be necessary in order to determine whether or not there is a difference in user response to the test and control user interface designs. That is, a large probability can indicate that the difference might be due to sampling when the responses for the test and control groups are no different. However, the difference can be real. Additional data can be collected, from which another probability can be determined.

A t-critical value can be determined based on a specified degrees of freedom. In accordance with at least one embodiment, the degrees of freedom is the combined number of partitions for each group (e.g., test and control groups) minus the number of groups. For example, if a number of partitions used for each of the test and control user groups is 32, the degrees of freedom is 62, i.e., 32+32−2

In addition to the degrees of freedom, a desired level of confidence can be used to determine the t-critical value. For example, a t-critical value corresponding to a 95% confidence interval and 62 degrees of freedom is 2. The t-critical value can be used as a cutoff between retaining or rejecting the null hypothesis.

In accordance with at least one embodiment, if the t-statistic is farther from 0 than the t-critical value, the null hypothesis is rejected; otherwise, the null hypothesis is retained. FIG. 6B provides a graphical illustration. A t-distribution curve 620 is shown, which curve 620 represents the distribution of the differences of means around 0, i.e., point 621. If a determined t-statistic is too far from point 621 based on a given t-critical value, the null hypothesis is rejected and the alternative hypothesis is accepted. The t-critical value sets the level at which the results are unlikely enough to retain the null hypothesis. In the example shown in FIG. 6B, the t-critical value is shown at points 622 and 623. A t-statistic value can be an x-value on the t-distribution. The t-statistic represents a number of standard deviations from the mean, assuming that the mean is zero from $H_0$. If t-statistic value is beyond the t-critical value, meaning that it falls to the right of point 623 or to the left of point 622, on the x-axis, then the null hypothesis is rejected and the alternate hypothesis is accepted. However, if the t-statistic falls within points 622 and 623, the null hypothesis is accepted.

One or more embodiments of the present disclosure can be used to determine a user response metric, e.g., CTR, using data collected from user web page access via the Internet. A confidence interval is identified and is used with the user response metric to determine an accuracy of the metric by applying the central limit theorem (CLT) and a T-distribution to the data. A t-statistic, and t-test, and one or more statistical inferences based on observed user response can be used to evaluate a user interface, and/or to compare multiple user interfaces based on a determined impact on user response to the multiple user interfaces.

To illustrate by way of a non-limiting example, assume that a CTR metric corresponding to a single user interface, e.g., one or more search web pages, is used as a measure of user response. As discussed herein, a CTR metric can be determined to be a number of clicks divided by a number of page views. In a case that a page corresponds to a search page, the CTR can be a number of clicks divided by a number of search page views, or put another way a number of clicks per search. With regard to an entire population, there is a variable, Z, which corresponds to a number of clicks for each search in an entire population. While Z, and a corresponding population mean, $Z_\mu$, and variance, $Z_{\sigma^2}$, may not necessarily be known, they can be estimated using a sample of the population.

To illustrate by way of a non-limiting example, a number of clicks and page views can be collected for a sample of searches, e.g., 10,000 searches. In such a case, there would be 10,000 values of CTR, corresponding to a number of clicks that occurred for a given search. Therefore, assuming every search is independent, in a case of 10,000 searches, there are 10,000 identically independently distributed (i.i.d.) random values of CTR.

In order to estimate the mean of CTR, and assuming that CTR can be any probability distribution, the central limit theorem (CLT) can be applied to the data. In accordance with the CLT and given a large sample size, T, (e.g., 10,000) of i.i.d. random values of some type of distribution, an average, $CTR_{avg}$, of these values is approximately normally distributed, with a mean equal to the population's mean, μ, and variance, $\sigma^2$, divided by the sample size, T. However, the population's mean, μ, and variance, $\sigma^2$, is unknown and therefore cannot be used to estimate a mean and variance for CTR.

To estimate the mean for CTR, in accordance with one or more embodiments of the present disclosure, the data (i.e., the page view and click data) is divided into K partitions. Using the page view and click data as one example, the data is collected and assigned to one of K partitions. In accordance with at least one embodiment, a number of CTR values, which number is approximately the same for all K partitions is determined. An average CTR can be computed for each of the K partitions. As long as the number of searches of each partition is large enough (e.g., 10,000), it can be concluded that the average CTR calculated for each partition, $CTR_{avg}$, is approximately normally distributed with the mean the same as the population mean, and the variance equal to the population variance, $\sigma^2$, divided by the sample size for each partition. The sample size for each partition is the same, or approximately the same.

Given K i.i.d. normal random variables $CTR_{avg}$, a t-distribution (a graphical illustration of which is shown in FIG. 6B) can be used to estimate a mean without knowing the population's mean and variance, as long as the data is normally distributed. Using the K i.i.d. normal random variables, the t-distribution can be used to estimate the mean of $CTR_{avg}$ using a confidence interval, e.g., a 95% or 99% confidence interval. The K i.i.d. normal random variables provide K point measures (i.e., one measure per partition) of $CTR_{avg}$. For example, a measure of a given partition, i, can be expressed as $CTR_{avg,i}$. A sample mean, $CTR_{mean}$, and sample standard deviation, $CTR_{stdDev}$, can be determined using expressions 506 and 507, respectively.

A confidence interval, e.g., 95% confidence interval, of the mean of $CTR_{avg}$ can be computed using expression 500 of FIG. 5A, where $t_{0.025}$ can be obtained using a statistical t-table such as table 504 of FIG. 5B and using a degrees of freedom (df) equal to (K−1).

Since the sample mean of $CTR_{avg}$, $CTR_{mean}$, is considered to be equivalent to a population mean, μ, the confidence interval for a population mean, μ, can also be computed using expression 505 of FIG. 5A. Using a 95% confidence interval as an example, it can be said that there is 95% probability that the true CTR falls into the range, R, determined using expression 500.

The previous example involved a single user interface design. Disclosed embodiments can also be used to evaluate multiple user interface designs, and/or to compare one user interface design can be compared to another based on determined user response to each of the designs. For example, embodiments presently disclosed can be used to evaluate, or measure, user response to one user interface design relative to user response to another user interface design. To illustrate by way of non-limiting example, embodiments of the present disclosure can be used to measure user response to a test user interface design relative to at least one control user interface design based on user response data corresponding to both the test and control user interface designs, and to examine one or more user response metrics to determine an existence, or absence, of an impact on user response to the user interface relative to the control user interface design(s).

In accordance with one or more embodiments, a percentage of users, i.e., a user sample, from an entire population of users, can be identified as a population sample. Half of the user sample is assigned to a test user interface design and half is assigned to a control user interface design. Data reflecting user interaction with, and/or response to, the user interface designs is collected. The data is partitioned into K partitions for the test group and K partitions for the control group.

The data collected can include one or more metrics, and/or the data collected can be used to generate one or more metrics. A confidence interval can be determined for each of the user response metrics, or the same confidence interval can be used for all of the metrics. That is, a confidence interval can be determined for each metric and each of the test and control user groups. A determined probability (e.g., a probability corresponding to a confidence interval) that a metric value is the same for both the test and control groups (e.g. the probability that a search CTR corresponding to the test user interface design is the same as the search CTR for the control user interface design) can be used to determine whether or not there is a difference between the test and control groups for a given metric. If the determined probability is very small and below some preset threshold, e.g., 5%, it can confidently be said that with 95% of probability, the metric value for the test and control user groups differ.

As discussed herein, a t-statistic can be used to determine the probability. The t-statistic can be computed using a sample mean, $X_{mean}$, and standard deviation, $X_{stdDev}$. For example, the sample mean, $X_{mean}$, and standard deviation, $X_{stdDev}$, can be determined using expressions 506 and 507, respectively, for the test and control groups and K partitions of the data corresponding to the test and control groups. Referring to FIG. 6C, an expression 630 can be used to generate a value of a t-statistic in accordance with one or more embodiments of the present disclosure. More particularly, a t-statistic, or t, can be determined using the $X_{mean}$ and $X_{stdDev}$ values, the degrees of freedom, and the number of partitions, K, associated with the test and control user groups. The determined t-statistic can be used together with the degrees of freedom to check a t-table for the alpha-associated probability (p-value), along with the predetermined alpha probability, e.g., 0.05. If the p-value is smaller than or equal to alpha, it can be concluded that there is a difference with confidence level 100 (1−alpha) %. If the p-value is greater than alpha, further analysis and/or data collection might be performed in order to determine whether or not an identified difference is due to an actual difference in user response to the test and control user interface designs, or is due to a sampling error.

A T-distribution, and corresponding tests, used in accordance with embodiments of the present disclosure can provide a robust statistical test. Even when the data collected is not perfectly normal but fairly symmetric, the T-distribution can be used to determine a difference, or absence of a difference, and/or to predict a population/true mean with a T-distribution. Even when the data collected is skewed, the T-distribution can generate an accurate result when the sample size is large enough. In accordance with disclosed embodiments, the data can be partitioned into multiple partitions. Since the data points (e.g., a metric value) from each partition can be assumed to be normally distributed, the t-test assumption is satisfied, and accuracy can be achieved. Sufficiency of a partition sample size can be determined by comparing the median and average from the K point measures to determine whether or not they are close to each other. If they are, the data can be said to be fairly symmetric and the T-Distribution can be used. Alternatively, additional data can be collected for each partition in order to achieve a normal distribution of the data. In addition, and although embodiments of the present disclosure have been described with reference to a T-distribution, it should be apparent that user response measures, and metrics, can be evaluated using other statistical methods, including Z-distribution testing, for example.

Figure 7:
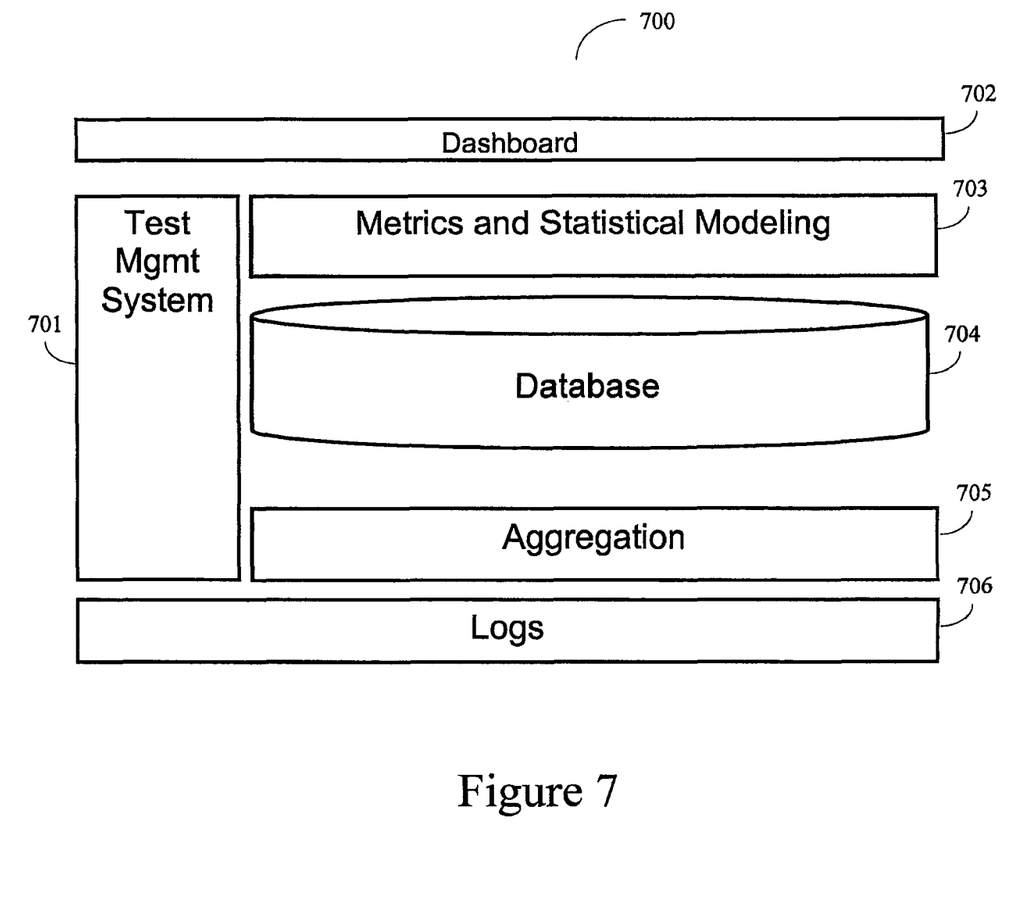
FIG. 7 provides an overview of components for use in accordance with one or more embodiments of the present disclosure.

FIG. 7 provides an overview of components for use in accordance with one or more embodiments of the present disclosure. Data collected can be stored in raw logs 706. The data stored in raw logs 706 can be filtered and aggregated using aggregation component 705. The filtered and aggregated data can be stored in database 704. Data collected for more than one test, for example. The aggregation component 705 can be used to group the collected data according to a corresponding test. In addition and as described herein, the collected data can be divided into test and control groups for a given test, and data corresponding to a given test or control group can be further partitioned into one of K partitions. Aggregation component 705 can be used to aggregate data. In addition, aggregation component 705 can be used to determine a data value, e.g., CTR, using data values collected in logs 706.

Test management system 701 provides a mechanism by which a user can define an experiment and track its status. For example and using test management system 701, a user can identify one or more user interfaces, or one or more product user interfaces, that are to be tested. A user can specify one or more user response metrics used to evaluate a user interface design. The user can use existing metrics, or define new metrics, which can be added. Statistical modeling and analysis 703 can be used to evaluate specified user interface(s) based on metrics specified by the user using test management system 701. In addition, statistical modeling and analysis 703 can define metrics used to evaluate user response to a user interface design. A dashboard 702 can be used to display one or more metrics, and/or results determined by metrics and statistical modeling component 703.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

We claim:

1. A method comprising:
identifying, by at least one processing system, at least one user response metric for use in evaluating user response to a first user interface for interfacing with a software application relative to a second user interface for interfacing with a software application, the first user interface having a user interface design that differs from the user interface design of the second user interface;
making, by the at least one processing system, displays of the first and second user interfaces available for user interaction with the first and second user interfaces;
collecting, by the at least one processing system, data from the user interaction with the displays of the first and second user interfaces, the collected data corresponding to the at least one user response metric;
generating, by the at least one processing system, first and second values of the at least one user response metric using the collected data for each of the first and second user interfaces, a first user response metric value corresponding to the first user interface with its user interface design and a second user response metric value corresponding to the second user interface with its user interface design;
determining, by the at least one processing system, whether the user response to the first user interface and the user response to the second user interface is the same or different using the first and second values of the at least one user response metric.

2. The method of claim 1, the determining further comprising:
comparing, by the at least one processing system, the first and second user response metric values to determine whether the first and second user response metric values are similar or different.

3. The method of claim 1, wherein the collecting step further comprises:
causing, by the at least one processing system, the first and second user interfaces to be displayed to a plurality of users; and
collecting, by the at least one processing system, user response data corresponding to the displayed first and second user interfaces from the plurality of users, the user response data collected from the plurality of users being used to generate the first and second values of the at least one user response metric used to determine whether the user response to the first and second user interfaces is similar or different.

4. The method of claim 3, wherein the user response data comprises input received via the displayed first and second user interfaces.

5. The method of claim 3, wherein the user response data comprises data corresponding to feedback solicited from the user.

6. The method of claim 5, wherein the feedback comprises answers to questions presented to users in a survey regarding the first and second user interfaces.

7. The method of claim 1, wherein the determining step further comprises:
   determining, by the at least one processing system, range of values of the user response metric based in part on a given confidence level.

8. The method of claim 1, wherein at least a portion of the first user interface is different from the second user interface.

9. A method comprising:
   identifying, by at least one processing system, at least one user response metric corresponding to both first and second user interfaces displayed by the at least one processing system, the first user interface for interfacing with a software application and having a user interface design that differs from the user interface design of the second user interface for interfacing with a software application, at least a portion of the first user interface is different from the second user interface;
   making, by the at least one processing system, displays of the first and second user interfaces available for user interaction with the first and second user interfaces;
   collecting, by the at least one processing system, data corresponding to the at least one user response metric that is used to evaluate user response to the first and second user interfaces, the data is collected from the user interaction with the displays of the first and second user interfaces;
   generating, by the least one processing system, first and second values of the at least one user response metric using the collected data, the first user response metric value corresponding to the first user interface with its user interface design and the second user response metric value corresponding to the second user interface with its user interface design;
   outputting, by the at least one processing system, the first and second user response metric values as an evaluation of the first user interface relative to the second user interface, the first and second user response metric values indicating whether the user response to the first and second user interfaces is similar or different.

10. The method of claim 9, wherein the collecting step further comprises:
   causing, by the at least one processing system, the first and second user interfaces to be displayed to a plurality of users; and
   collecting, by the at least one processing system, user response data corresponding to the displayed first and second user interfaces from the plurality of users, the user response data collected from the plurality of users being used to generate the first and second user response metric values indicating whether the user response to the first and second user interfaces is similar or different.

11. The method of claim 10, wherein the user response data comprises input received via the displayed first and second user interfaces.

12. The method of claim 10, wherein the user response data comprises data corresponding to feedback solicited from the user.

* * * * *